Patented Oct. 11, 1927.

1,645,096

UNITED STATES PATENT OFFICE.

GUSTAV ERDMANN, OF RADEBEUL, NEAR DRESDEN, GERMANY, ASSIGNOR TO THE FIRM: GEHE & CO. A.-G., OF DRESDEN, GERMANY.

MANUFACTURE OF ERGOT PREPARATION.

No Drawing. Application filed May 28, 1926, Serial No. 112,388, and in Germany March 18, 1925.

This invention has reference to a process for the manufacture of ergot preparation of great commercial purity and high efficiency. In the ergot—(*Claviceps purpurea*, Fries-Tulasne) a great number of different constituents have been found; but nevertheless it was not known heretofore what active medical constitutents are actually contained in the ergot drug. This is due to the fact that the complex ingredients of the drug are very sensitive against a treatment with chemical agents and against the usual methods of preparation of the extract, and are thereby undergoing a partial decomposition, and in view thereof a considerable portion of the constitutents of ergot mentioned in the scientific literature is not contained at all in the drug.

Now, this invention refers to a method of manufacturing a purified ergot preparation free from foreign ingredients, this method being particularly distinguished by its being carried out with the most careful saving of the drug and of its valuable constituents. Broadly speaking the new method is based on the fact that it starts directly with the oil-containing drug, the oily extract produced or the solid ingredients obtained therefrom being submitted to an extensive purification process in accordance with the methods of the chemistry of alkaloids, which results in a rapid separation of the basic constituents.

Thus, in accordance with this process no vigorously acting chemicals, such as acids, acid salts, or alkalies or metals of the alkaline earths are employed during the treatment of the drug; and I also avoid extraction of the drug at a high temperature. By acting in this manner every injurious change of the nature of the active constituents present in the drug is avoided, and ergot preparations are obtained which are free from foreign ingredients, while the active constituents are contained unchanged therein.

In the practical operation of my method I may proceed by submitting the ordinarily finely ground drug to the extraction with ether or other organic solvents (such as benzol or its homologues, chlorinated hydrocarbons and the like) in the cold, the portion remaining after the separation of the ethereal solution and the driving off of the ether being then mixed with petroleum naphtha, petroleum-ether or with other suitable substances. A precipitate is produced thereby which is first carefully dried over lime, and is then taken up by dilute acids and is freed from accompanying substances by the addition of ether. From the purified acid solution thus obtained the bases are precipitated by the addition of ammonia or of other liquids of alkaline reaction, and are then converted into aqueous solution by means of tartaric acid or citric acid.

One may also proceed by precipitating the ethereal shaken-up extract of the ergot with acid ether, and by then rubbing up the precipitate which may be previously dried if desired, with liquids having an alkaline reaction, and by dissolving the free bases in chloroform. From the chloroform-solution the bases are precipitated with petrol-ether or naphtha, and the salts are obtained therefrom in the usual manner; or the salts are precipitated from the chloroform solution with acid ether.

*Example.*—5 kilogrs. of ergot are finely ground and are thoroughly extracted with ether. The clear oily residue, after having been freed from the solvent is then treated with an excess of petrol-ether or naphtha, while constantly stirring. A yellowish, flocculent precipitate is immediately separated out which is sucked off, is carefully washed and then dried over lime. Then this solution is dissolved by rubbing it up with 10% acetic acid, and the foreign or ballast-ingredients are again removed by shaking with ether several times, and the acid solution is filtered to a clear filtrate and then the mixture of alkaloids is precipitated, while constantly stirring, by means of ammonia. The precipitate is sucked off, and dried again over lime. From the dry, grayish white powder the mixture of tartrate-salts is prepared in the usual manner. The contents of nitrogen of the mixture of bases amounts on an average to 9.5 to 10.5%. A sample of the preparation dissolved with glacial acetic acid which contains 1% solution of ferric-sulphate 1:100, if superimposed upon concentrated sulphuric acid yield a corn-flower-blue zone at the point of contact of the layers. The mixture of salts constitutes a white powder which is readily soluble in water.

It is, of course, to be understood that my method admits of deviations in the solvents and reagents and proportions employed and in other particulars, except as particularly set forth and enumerated in the appended claims.

I claim:—

1. The method of manufacturing purified ergot-preparations, which consists in extracting the ergot drug with neutral substantially pure ether at a low temperature, removing the ether from the extract, submitting the extract to the action of organic acid and of alkali in separate stages, thereby precipitating the bases, dissolving them in chloroform, treating the solution with petroleum distillates, and thereby reprecipitating the bases therefrom, and converting the bases into salts.

2. The method of manufacturing an ergot preparation, which consists in treating the crude drug with substantially pure, organic, non-petrolic, liquid fat-solvents at a low temperature, separating the resulting liquid from the solid residue, and treating the liquid with an organic acid and with liquid petroleum distillates.

3. The method of manufacturing an ergot preparation, which consists in treating the crude drug first with substantially pure, organic, non-petrolic liquid fat-solvents at a low temperature, separating the resulting liquid from the solid residue, and treating said liquid with acidified ether, and with liquid petroleum distillates.

4. The method of manufacturing an ergot preparation which consists in treating the crude drug with substantially pure organic, non-petrolic fat solvents at a low temperature, separating the resulting liquid from the drug, removing the bulk of the solvent from the liquid, and treating the then resulting residue of the extract with dilute organic acids and with ether and liquid, low-boiling petroleum distillates.

5. The method of manufacturing an ergot preparation, which consists in treating the crude drug with substantially pure ether at a low temperature, separating the liquid extract from the drug, and treating said extract with dilute organic acid and with liquid, low-boiling petroleum distillation products, precipitating the basic substances from the extract by ammonia, and purifying the precipitated products.

6. The method of manufacturing an ergot preparation, which consists in treating the crude drug with substantially pure ether, and at a low temperature, separating the ether extract from the drug, removing the bulk of the solvent ether from the extract, and treating the remaining residue with acidified ether, and then treating the resulting product with alkaline liquids.

7. The method of manufacturing an ergot preparation, which consists in treating the crude drug with substantially pure ether at a substantially low temperature, separating the ether extract from the drum, adding liquid, low-boiling petroleum-distillate thereto, and treating the remaining solution with dilute organic acid and with ether.

8. The method of manufacturing an ergot preparation, which consists in treating the crude drug with substantially pure ether at a low temperature, separating the ether extract from the drug, adding liquid, low-boiling petroleum-distillate thereto, and then treating the remaining solution with dilute acetic acid and with ether.

GUSTAV ERDMANN.